United States Patent
Haji et al.

(10) Patent No.: US 10,300,553 B2
(45) Date of Patent: May 28, 2019

(54) LASER PROCESSING MACHINE

(71) Applicant: AMADA HOLDINGS CO., LTD., Kanagawa (JP)

(72) Inventors: Shigeyuki Haji, Kanagawa (JP); Taisuke Hirasawa, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 274 days.

(21) Appl. No.: 15/029,753

(22) PCT Filed: Oct. 9, 2014

(86) PCT No.: PCT/JP2014/077057
§ 371 (c)(1),
(2) Date: Apr. 15, 2016

(87) PCT Pub. No.: WO2015/064332
PCT Pub. Date: May 7, 2015

(65) Prior Publication Data
US 2016/0228982 A1    Aug. 11, 2016

(30) Foreign Application Priority Data

Oct. 31, 2013 (JP) ................................. 2013-226231
Aug. 28, 2014 (JP) ................................. 2014-174080

(51) Int. Cl.
*B23K 26/00* (2014.01)
*B23K 26/02* (2014.01)
(Continued)

(52) U.S. Cl.
CPC .............. *B23K 26/00* (2013.01); *B23K 26/02* (2013.01); *B23K 26/08* (2013.01); *B23K 26/38* (2013.01);
(Continued)

(58) Field of Classification Search
CPC ............ B23K 37/0235; B23K 37/0408; B23K 26/08; B23K 26/38; B23K 2201/18; B23K 26/706; B23K 26/00; B23K 26/02
(Continued)

(56) References Cited

U.S. PATENT DOCUMENTS

| | | | | |
|---|---|---|---|---|
| 5,906,469 A | * | 5/1999 | Oka | ................... H01L 21/67265 414/416.08 |
| 6,069,646 A | * | 5/2000 | Okabe | ...................... B41J 2/442 347/257 |
| 2009/0255910 A1 | * | 10/2009 | Feistel | ...................... F16P 1/06 219/121.67 |

FOREIGN PATENT DOCUMENTS

| | | | |
|---|---|---|---|
| CN | 202813202 U | * | 3/2013 |
| EP | 2471625 A2 | | 7/2012 |

(Continued)

OTHER PUBLICATIONS

Extended European Search Report in related European Application No. 14857259.7, dated Apr. 12, 2017.
(Continued)

*Primary Examiner* — Dana Ross
*Assistant Examiner* — Kuangyue Chen
(74) *Attorney, Agent, or Firm* — Greenblum & Bernstein, P.L.C.

(57) ABSTRACT

A laser processing machine includes a machine main body that has a laser processing head, a processing table on which a workpiece to be processed is laid; and a light-shielding cover that is provided above the processing table, and covers an upper surface of the processing table. The cover is transformable between a deployed state and retracted state, and can adjust an area covering the upper surface of the processing table. According to the laser processing machine, it is possible to cover only a necessary area for laser (Continued)

processing by its compact cover without inhibiting workability for carrying in/out the workpiece.

8 Claims, 13 Drawing Sheets

(51) Int. Cl.
*B23K 26/70* (2014.01)
*B23K 37/02* (2006.01)
*B23K 37/04* (2006.01)
*B23K 26/08* (2014.01)
*B23K 26/38* (2014.01)
*B23K 101/18* (2006.01)

(52) U.S. Cl.
CPC ........ *B23K 26/706* (2015.10); *B23K 37/0235* (2013.01); *B23K 37/0408* (2013.01); *B23K 2101/18* (2018.08)

(58) Field of Classification Search
USPC .................................................. 219/121.82
See application file for complete search history.

(56) References Cited

FOREIGN PATENT DOCUMENTS

| | | |
|---|---|---|
| JP | 05-337675 A | 12/1993 |
| JP | 6-226480 | 8/1994 |
| JP | 09-57438 A | 3/1997 |
| JP | 9-271988 | 10/1997 |
| JP | 9-295180 | 11/1997 |
| JP | 11-333580 | 12/1999 |
| JP | 2000-52075 | 2/2000 |
| JP | 2000-351032 | 12/2000 |
| JP | 2001-208513 | 8/2001 |
| JP | 2004-202533 A | 7/2004 |
| JP | 2005-28395 | 2/2005 |
| JP | 2013-35006 | 2/2013 |
| WO | 2013/037927 | 3/2013 |

OTHER PUBLICATIONS

International Search Report issued in PCT/JP2014/077057, dated Dec. 22, 2014.

* cited by examiner

LASER PROCESSING MACHINE

TECHNICAL FIELD

The present invention relates to a laser processing machine that includes a single-function processing machine for carrying out only laser processing, a combined processing machine for carrying out both of laser processing and turret punch pressing, and so on.

BACKGROUND ART

In a laser processing machine that emits a laser light to a plate-like workpiece to laser-process the workpiece, it is preferable that a portion being processed is covered by a cover for eye-protection and dust-avoidance. A processing machine provided with a cover that covers an entire of the processing machine is heretofore known. In addition, a patent Document 1 listed below discloses a laser processing machine provided with a cover that covers an upper surface of a processing table on which a workpiece is laid and that can move along a movement direction of the workpiece.

PRIOR ART DOCUMENT

Patent Document

Patent Document 1: Japanese Patent Application Publication No. H9-295180

SUMMARY OF INVENTION

If a cover that covers an entire of a processing machine is provided, a size of the machine must become large. Especially in a processing machine whose processing table is movable, since an entire movable area of the processing table must be covered by a cover, a size of the cover must become large and thereby its cost becomes high due to that. In addition, since the cover covers an entire of the processing machine, workability for carrying in/out a workpiece becomes worse.

Further, if a cover as disclosed in the Patent Document 1 is provided, a size of the cover may be made smaller than a size of a cover that covers an entire of a processing machine. However, since a covered area of the processing table is determined according to the size of the cover, there are limitations to cover only a necessary area by the compact cover without inhibiting workability for carrying in/out a workpiece.

An object of the present invention is to provide a laser processing machine in which only a necessary area for laser processing can be covered by a compact cover without inhibiting workability for carrying in/out a workpiece.

An aspect of the present invention provides a laser processing machine comprising: a machine main body that has a laser processing head; a processing table on which a workpiece to be processed is laid; and a light-shielding cover that is provided above the processing table and covers an upper surface of the processing table, wherein the cover is transformable between a deployed state and retracted state, and can adjust an area covering the upper surface of the processing table.

According to the first aspect, since an area of the upper surface of the processing table covered by the cover can be adjusted, it is possible to cover only an area for laser processing by the cover. Therefore, it is possible to configure the cover compactly (compared with a full cover covering an entire surface of the processing table, or a cover having a fixed size) while maintaining light-shielding performance of a laser light during laser processing, noise-shielding performance for noises generated during processing, and dust-resistant performance for spatters, grits, dusts and so on generated during processing. As the result, light-weighting and cost-reduction of the cover can be achieved. In addition, since the cover can be opened to expose a necessary area for carrying in/out a workpiece when carrying in/out the workpiece, it is possible to carry in/out the workpiece easily.

It is preferable that the cover can also change a position thereof for covering the processing table.

According to this, since the cover can change its position in addition to its size, it is possible to protect only a necessary area for laser processing efficiently.

In addition, it is preferable that the cover is configured of a plurality of divided covers that have different sizes and assembled slidably in sequence to be a telescopic type cover transformable between the deployed state and the retracted state.

According to this, the telescopic type cover can be configured to have a simple structure, and the cover can be operated easily.

In addition, it is preferable that the cover is provided with a window with a light-shielding filter.

According to this, a state inside the cover can be visible during laser processing.

In addition, it is preferable that a gap that allows the workpiece to pass therethrough is formed between a lower edge of the cover and the processing table, and an up-and-down shutter that shuts the gap when being protruded upward is provided so as to be capable of protruding from an upper surface of the processing table.

According to this, it is possible to prevent a laser light from leaking through the gap by lifting up the up-and-down shutter. On the other hand, it is possible to move a workpiece while covering the processing table by the movable cover 30 by moving own the up-and-down shutter. Note that, since the up-and-down shutter never contacts with a workpiece, it is less wasted and superior in durability. A gap is closed by a flexible cover in prior art (see the Patent Document 1), but the flexible cover is inferior in durability due to contacts with a workpiece.

In addition, it is preferable that the laser processing machine further comprises a sensor provided above the processing table to detect a contact with the workpiece moving on the processing table.

According to this, it is possible to stop the laser processing machine when the sensor contacts with a curled-up or jammed workpiece. Therefore, it becomes possible to surely prevent the cover, the carriage that holds a workpiece and so on from being damaged.

In addition, it is preferable that the laser processing machine further comprises a carriage that is movable within the cover, and holds the workpiece, and a turret that carries out turret punch pressing on the workpiece while moving the carriage.

According to this, it is possible to carry out punch pressing in addition to laser processing while the cover never be impeditive during punch pressing.

BRIEF DESCRIPTION OF DRAWINGS

FIG. 1 (a) is a perspective view of a laser processing machine (combined machine) according to a first embodiment (a cover-deployed state), and (b) is a perspective view of the laser processing machine (a cover-retracted state).

FIG. 5 (a) is a cross-sectional view of the cover in the deployed state, and (b) is a cross-sectional view of the cover in the retracted state.

FIG. 6 (a) is a cross-sectional view showing an up-and-down shutter for light shielding that is moved up, and (b) is a cross-sectional view showing the up-and-down shutter for light shielding that is moved down.

FIG. 7 (a) is an enlarged cross-sectional view showing a sensor for detecting a contact between a cover and a workpiece, and (b) is an enlarged perspective view showing the sensor.

FIG. 9 (a) is a perspective view of a laser processing machine (single-function processing machine) according to a second embodiment (a cover-deployed state), and (b) is a perspective view of the laser processing machine (a cover-retracted state).

DESCRIPTION OF EMBODIMENTS

Hereinafter, embodiments will be described with reference to the drawings.

A laser processing machine M1 according to a first embodiment is a punch-pressing and laser-processing combined machine configured by combining a turret punch pressing machine and a laser processing machine. As shown in FIG. 1(a) and FIG. 1(b), the laser processing machine M1 includes a machine main body 10, a processing table (such as a fixed table 14 and a movable table 15 that will be described later) on which a workpiece to be processed is laid, and a light-shielding cover (also referred as a movable cover 30 and a fixed cover 40, or a cabin) that covers the processing table.

Figure 2:
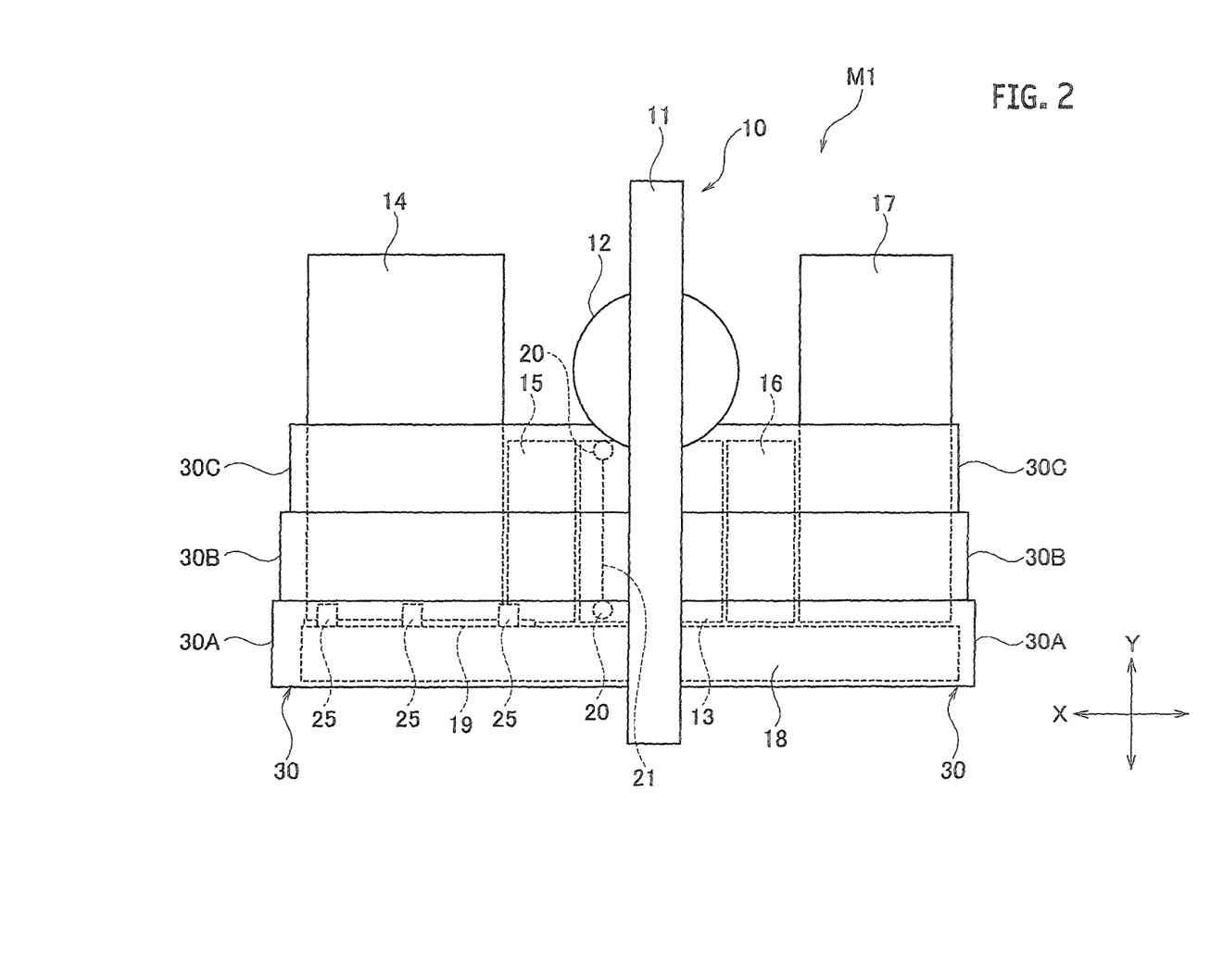
FIG. 2 It is a schematic plan view of the laser processing machine (a deployed state of left and right covers).

The machine main body 10 includes a laser processing head 20, and a turret 12 for punch pressing (see FIG. 2). In laser processing, a laser light is emitted to a workpiece W (see FIG. 3 and FIG. 4) laid on the processing table from the laser processing head 20, and thereby the workpiece W is laser-processed. In punch pressing, a workpiece W is punch-pressed by a tool (punches and dies) installed on the turret 12 while moving carriages 18 and 19 (see FIG. 2) that holds the workpiece W.

As shown in FIG. 2, when defining two directions orthogonal to each other in a horizontal plane as an X-axis direction and a Y-axis direction, the machine main body 10 provided with the turret 12 and the laser processing head 20 is disposed at almost the center of the laser processing machine M1 in the X-axis direction, and a fixed table 13 is disposed beneath the machine main body 10. In addition, a movable table 15 and a fixed table 14 are disposed in sequence on one side (a left side in FIG. 2) of the machine main body 10 in the X-axis direction. A movable table 16 and a fixed table 17 are disposed in sequence also on another side (a right side in FIG. 2) of the machine main body 10.

The machine main body 10 has a gate-shaped frame 11, and the turret 12 is provided rotatably on the frame 11. The turret 12 has an upper turret to which punches are installed, and a lower turret to which dies are installed. The turret 12 is configured to be capable of indexing an installed tool at a processing position in punching.

The above-mentioned fixed table 13 for supporting a plate-like workpiece W is provided on the frame 11. The above-mentioned movable tables 15 and 16 are movably provided on both sides of the fixed table 13 in the Y-axis direction. The above-mentioned fixed tables 14 and 17 are provided on outer sides of the movable tables 15 and 16, respectively. Note that the processing table is comprised of the fixed table 13, 14 and 17, and the movable table 15 and 16, and they may be referred also as the processing table merely if they aren't discriminated from each other.

Each one end of the movable tables 15 and 16 is extended in the X-axis direction, and then coupled with a Y-axis carriage 18 that is movable in the Y-axis direction. In punching, the Y-axis carriage 18 and the movable tables 15 and 16 are moved in the Y-axis direction, and can be aligned at their desired positions.

An X-axis carriage 19 that is movable in the X-axis direction is provided on the Y-axis carriage 18. Clamping devices 25 for clamping an end edge of the workpiece W are installed on the X-axis carriage 19. Therefore, the clamping devices 25 are moved in the X-axis direction on the Y-axis carriage 18 aligned at its desired position along the Y-axis direction. The clamping devices 25 are arranged so as to clamp a side edge (a lower side edge in FIG. 2) of the rectangular workpiece W that extends in the X-axis direction.

A Y-axis sub-carriage 21 is provided above the movable table 15 on the one side of the machine main body 10. The laser processing head 20 is attached to the Y-axis sub-carriage 21, and can move in the Y-axis direction along the Y-axis sub-carriage 21. Note that, in FIG. 2 and FIG. 4, the laser processing head 20 is shown at its respective movable limit positions on the Y-axis sub-carriage 21.

In punch pressing by the laser processing machine M1, a workpiece W is moved to a processing position by the Y-axis carriage 18 and the X-axis carriage 19, and then aligned at the processing position. Namely, the workpiece W is carried onto the processing table, and then its above-mentioned side edge is clamped by the clamping devices 25 after an original point is set. The workpiece W clamped by the clamping devices 25 is moved to the processing position by the Y-axis carriage and the X-axis carriage 19, and then aligned at the processing position. The workpiece W aligned at the processing position is punch-pressed.

In addition, in a case where of laser cutting an outline of a workpiece W after punch pressing, or a case of carrying out only laser processing such as laser cutting to a workpiece W, laser processing is carried out by moving the Y-axis sub-carriage 21 and the X-axis carriage 19 in a state where the Y-axis carriage 18 is fixed at an original-point position.

Next, a structure of the cover (the movable cover 30 and the fixed cover 40) disposed above the processing table will be described.

Figure 1:
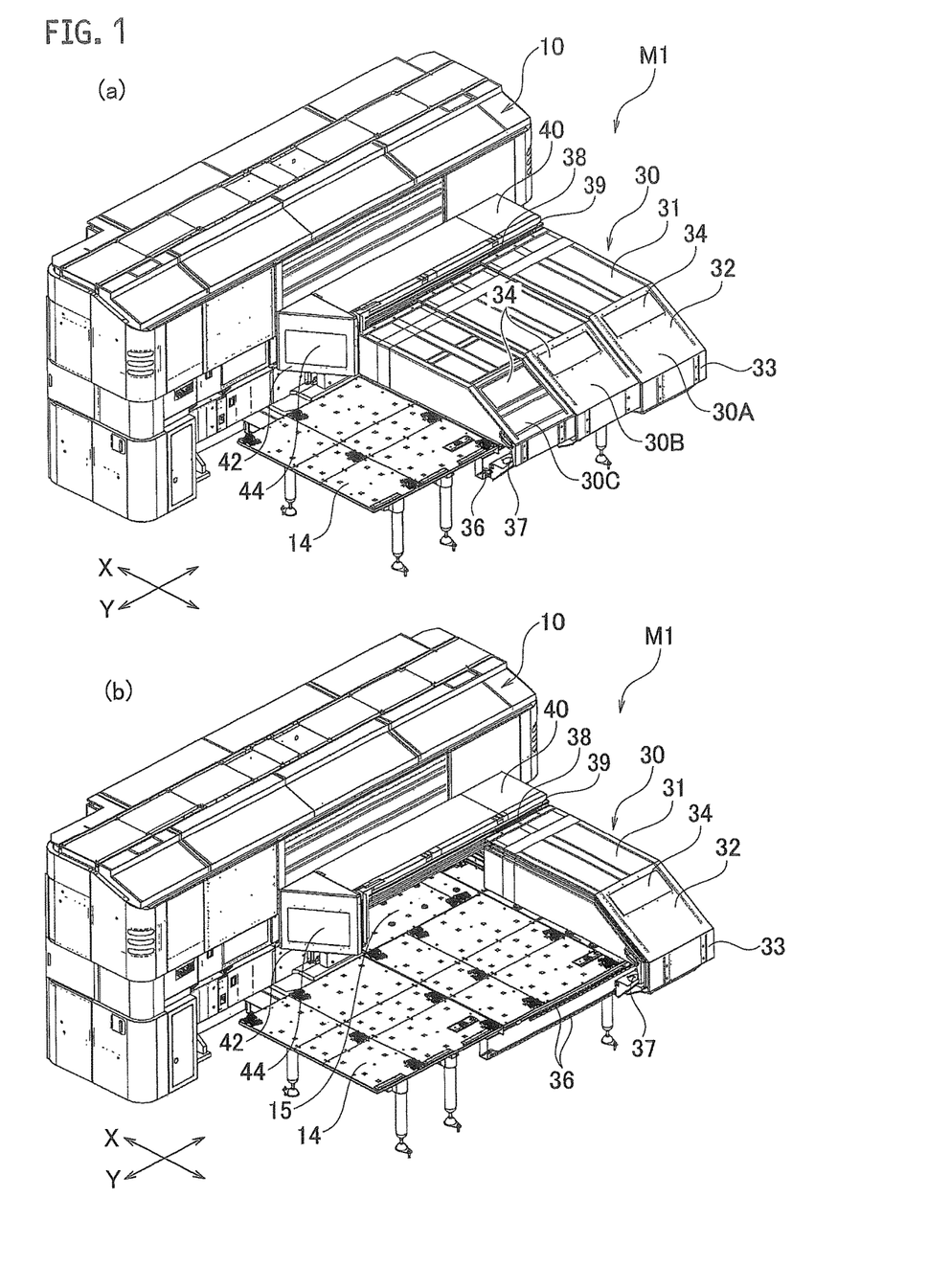

As shown in FIG. 1, the cover (the movable cover 30 and the fixed cover 40) covers a laser processing area, and protects its inside in order to prevent a laser light from leaking to its outside. The cover (the movable cover 30 and the fixed cover 40) has a size that enables movements of carriages 18, 19 and 20 in its inside. As shown in FIG. 2, the movable cover 30 and the fixed cover 40 are disposed above the processing table (the fixed tables 14 and 17, and the movable tables 15 and 16) on both sides of the machine main body 10, respectively. Note that, in FIG. 2, the fixed cover 40 is not shown. In addition, in FIG. 1, only the movable cover 30 and the fixed cover 40 on the left side are visible, and the movable cover 30 and the fixed cover 40 on the right side are hidden behind the machine main body 10.

The fixed cover 40 is fixed on a side portion of the machine main body 10. A guide rail 38 extending in the Y-axis direction is provided on a side face of the fixed cover 40. In addition, an end cover(s) 42 that can be opened upward when needed is provided at both ends (or, at one of the both ends) of the fixed cover 40 in the Y-axis direction. A window 44 through which its inside is visible is provided on the end cover 42. Note that the end cover 42 may not be provided obliquely, and may be unable to be opened.

On the other hand, the movable cover 30 is configured to be changed between a deployed state shown in FIG. 1(a) and a retracted state shown in FIG. 1(b). Therefore, the movable cover 30 can adjust an area (largeness) covering the processing table (mainly, the fixed table 14). In addition, the movable cover 30 is movable in the Y-axis direction, and thereby also can also change its position for covering the processing table (mainly, the fixed table 14).

The movable cover 30 is configured of divided covers 30A, 30B and 30C that have different sizes from each other and assembled slidably to each other in sequence in the Y-axis direction. Namely, the movable cover 30 is a telescopic type cover that is transformable between the deployed state in which the divided covers 30A, 30B and 30C are not stacked over each other and the retracted state in which the divided covers 30A, 30B and 30C are stacked over each other. The deployment and retraction of the divided covers 30A, 30B and 30C may be done manually, or done automatically by an air cylinder or an electric cylinder.

Engagement portions 39 and 37 of each of the divided covers 30A, 30B and 30C are engaged with the guide rail 38 provided on the side face of the fixed cover 40 and a guide rail 36 provided along a side edge of the fixed table 14, respectively, and thereby each of the divided covers 30A, 30B and 30C can slide in the Y-axis direction.

Each of the divided covers 30A, 30B and 30C includes a horizontal plate 31 parallel to the upper surface of the fixed table 14, a slanted plate 32 slanted downward from one edge of the horizontal plate 31, and a vertical plate 33 vertically extended downward from an edge of the slanted plate 32. The above-mentioned engagement portion 39 slidably engaged with the guide rail 38 is provided along another edge of the horizontal plate 31, and the above-mentioned engagement portion 37 slidably engaged with the guide rail 36 is provided on a lower-end inner surface of the vertical plate 33.

A window 34 with a light-shielding filter through which its inside is visible is provided in each slanted plate of the divided covers 30A, 30B and 30C. Note that the window(s) 34 is provided at a height level that enables an operator who is standing to see the inside widely.

Figure 5:
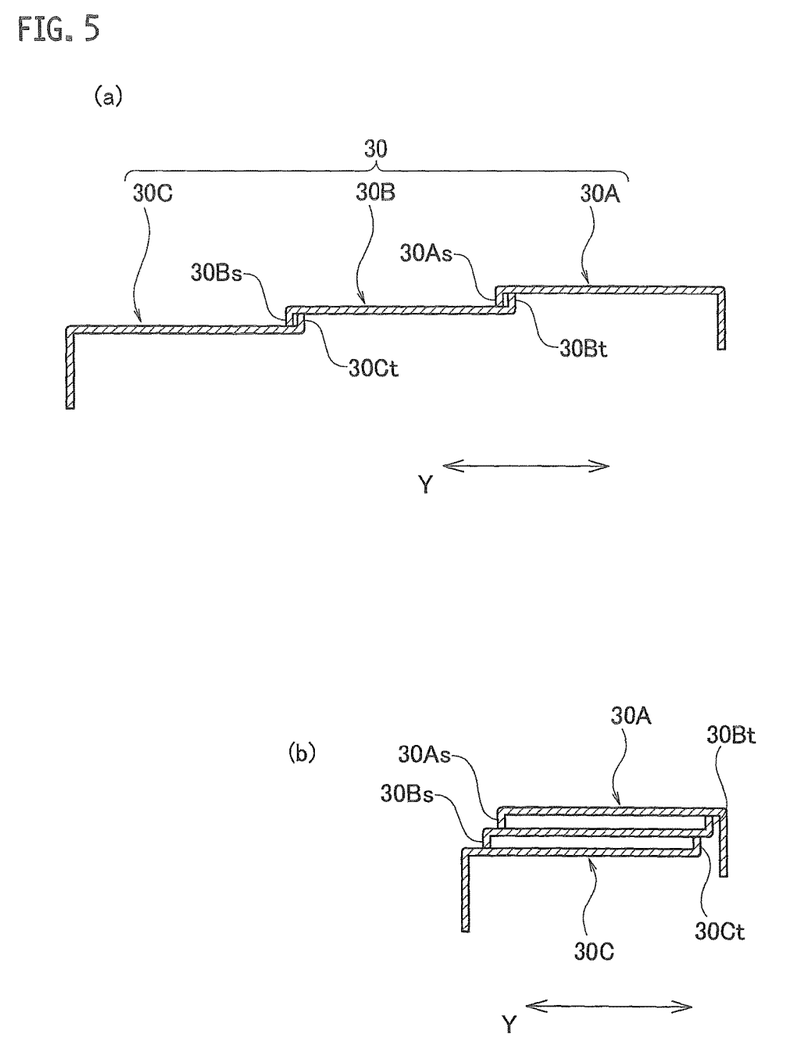

As shown in FIG. 5(a) and FIG. 5(b), along a front edge of the divided cover 30A, a flange 30As that engages with a flange 30Bt along a rear edge of the next divided cover 30B is provided. Similarly, along a front edge of the divided cover 30B, a flange 30Bs that engages with a flange 30Ct along a rear edge of the next divided cover 30C is provided. By the engagements of the flanges, a laser light and so on can be prevented from leaking through gaps between the divided covers 30A, 30B and 30C.

Figure 6:
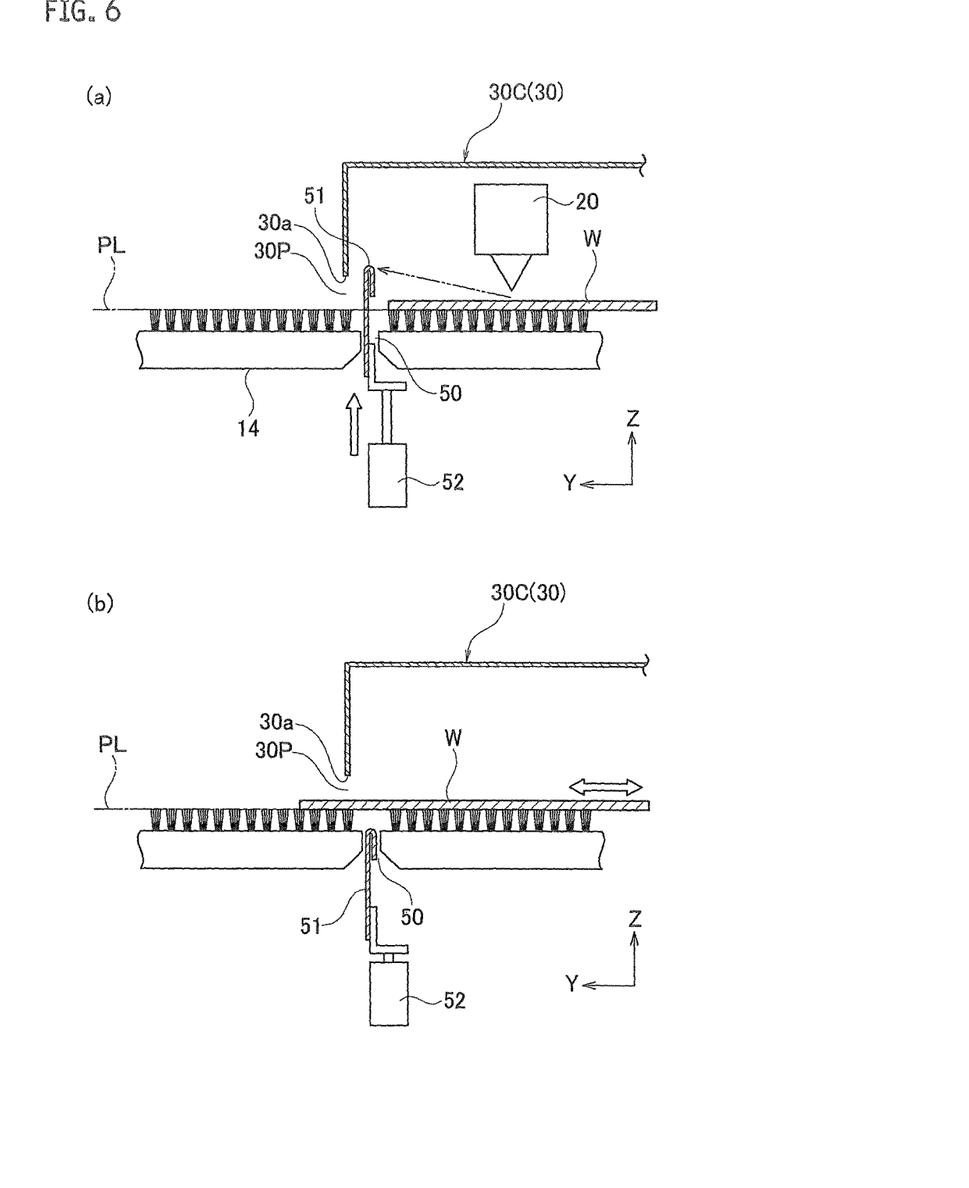

As shown in FIG. 6(a) and FIG. 6(b), a gap 30P that allows a workpiece W to pass along a pass line PL is formed between a lower edge 30a of a front end of the front-most divided cover 30C among the divided covers 30A, 30B and 30C that constitute the movable cover 30 and the fixed table 14. At this position, an up-and-down shutter 51 is provided so as to be capable of protruding from the upper surface of the fixed table 14. The gap 30P is shut by protruding the up-and-down shutter 51 upward, so that a laser light can be prevented from leaking to the outside through the gap 30P.

The up-and-down shutter 51 is accommodated in an inside of a slit 50 formed on the fixed table 14 when it is not used as shown in FIG. 6(b), and is lifted up by a lifting mechanism 52 such as an air cylinder when it is used as shown in FIG. 6(a). According to the mechanism like this, it becomes possible to shut the gap 30P.

Figure 7:
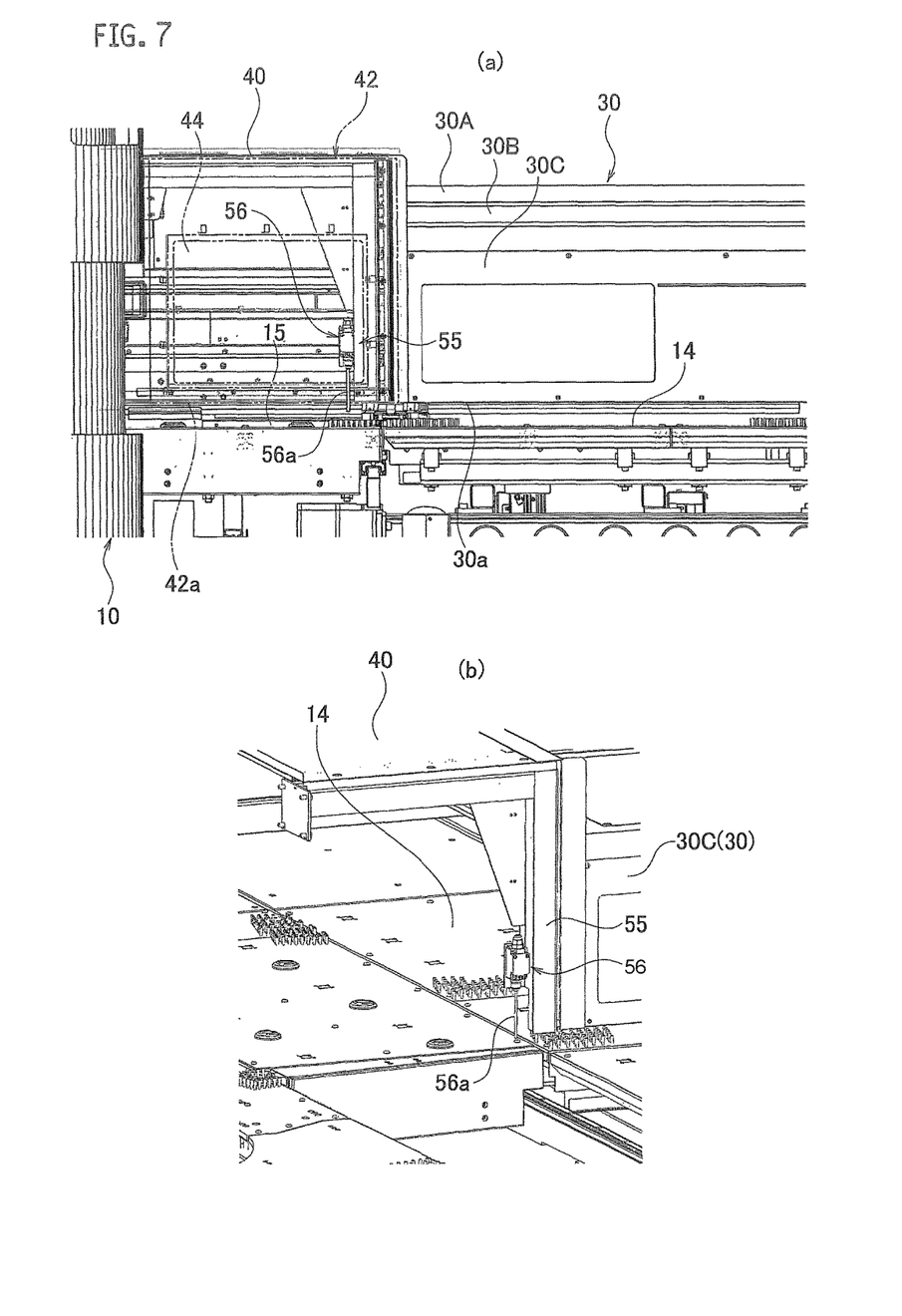
Figure 8:
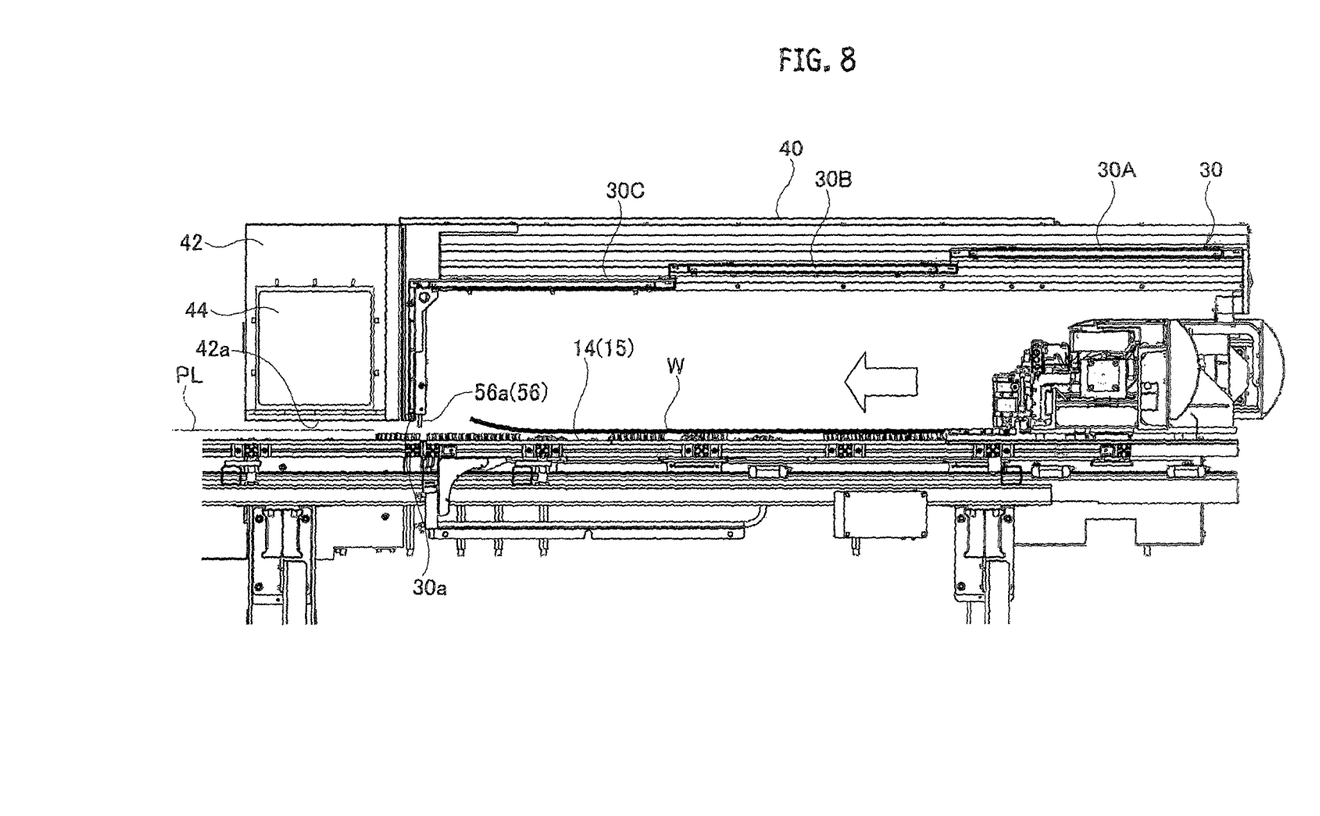
FIG. 8 It is a cross-sectional side view of the laser processing machine.

As shown in FIG. 7(a), FIG. 7(b) and FIG. 8, a bracket 55 is fixed near the end cover 42 of the fixed cover 40, and a sensor 56 is attached to the bracket 55. The sensor 56 detects a contact between the lower edge 30a of the front end of the divided cover 30C and a workpiece W moved in the Y-axis direction on the fixed table 14. The sensor 56 in the present embodiment is a contact sensor, and a distal end of its contact element 56a is slightly protruded from the lower edge 30a of the divided cover 30C and a lower edge 42a of the end cover 42, so that it can be visible from the outside. The sensor 56 contacts its contact element 56a with a workpiece W before the workpiece W that is curled-up or jammed contacts with the lower edge 30a of the divided cover 30C or the like, and thereby the laser processing machine M1 is stopped when a contact with the workpiece W is detected. Note that the sensor 56 may be fixed at a position other than the fixed cover 40 as long as it is disposed above the processing table.

Next, operations of the cover (the movable cover 30 and the fixed cover 40) will be described.

Figure 3:
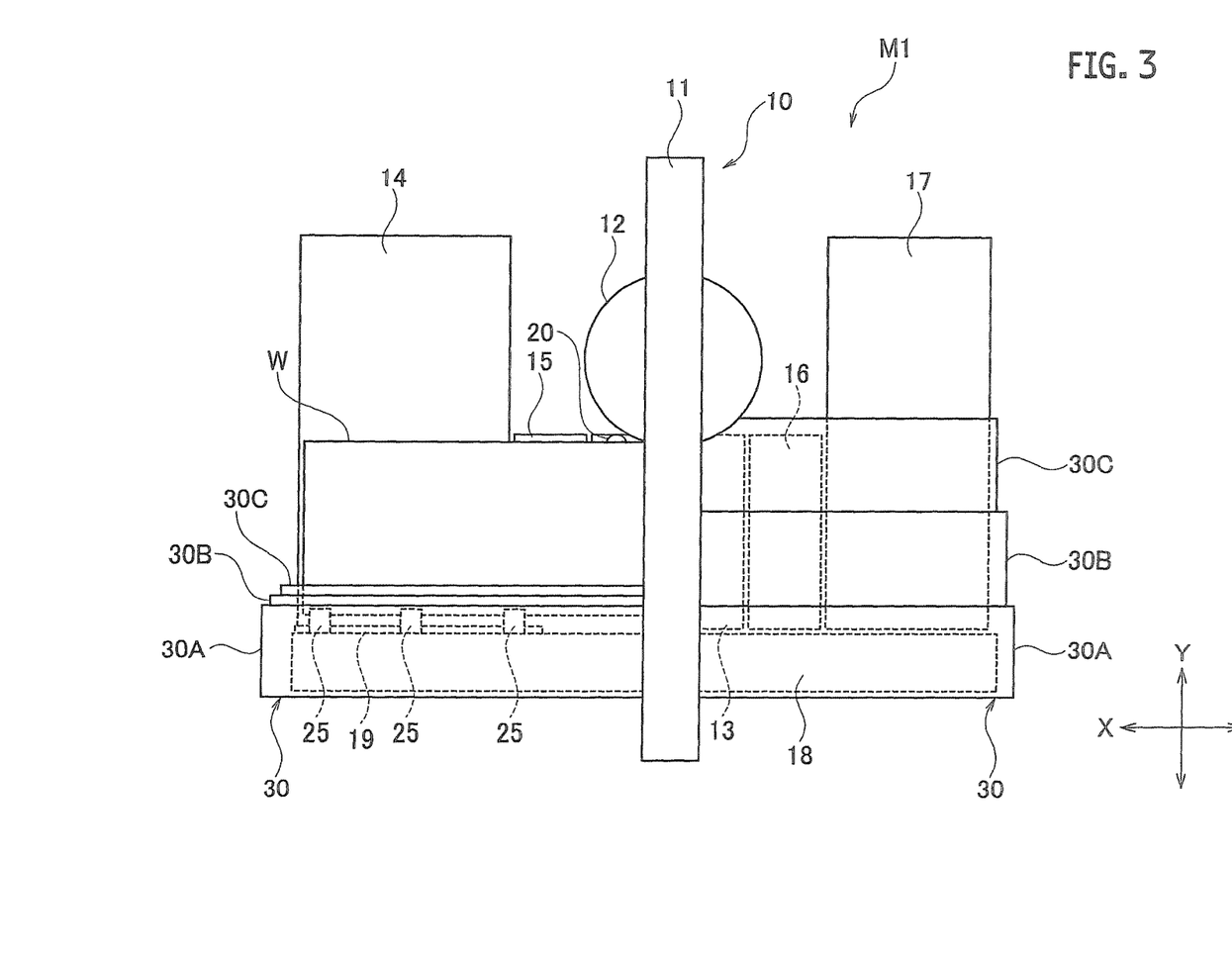
FIG. 3 It is a schematic plan view of the laser processing machine (a retracted state of the left cover: a deployed state of the right cover: a workpiece carried-in state).

It is possible to easily carry in/out a workpiece W by adjusting a size of the movable cover 30 as needed. For example, in a case where a workpiece W is carried-in or carried-out while aligning it at a first original point as shown in FIG. 3, the workpiece W can be carried-in or carried-out by means of the clamping devices 25 by setting the movable cover 30 in the retracted (fully-opened) state.

Figure 4:
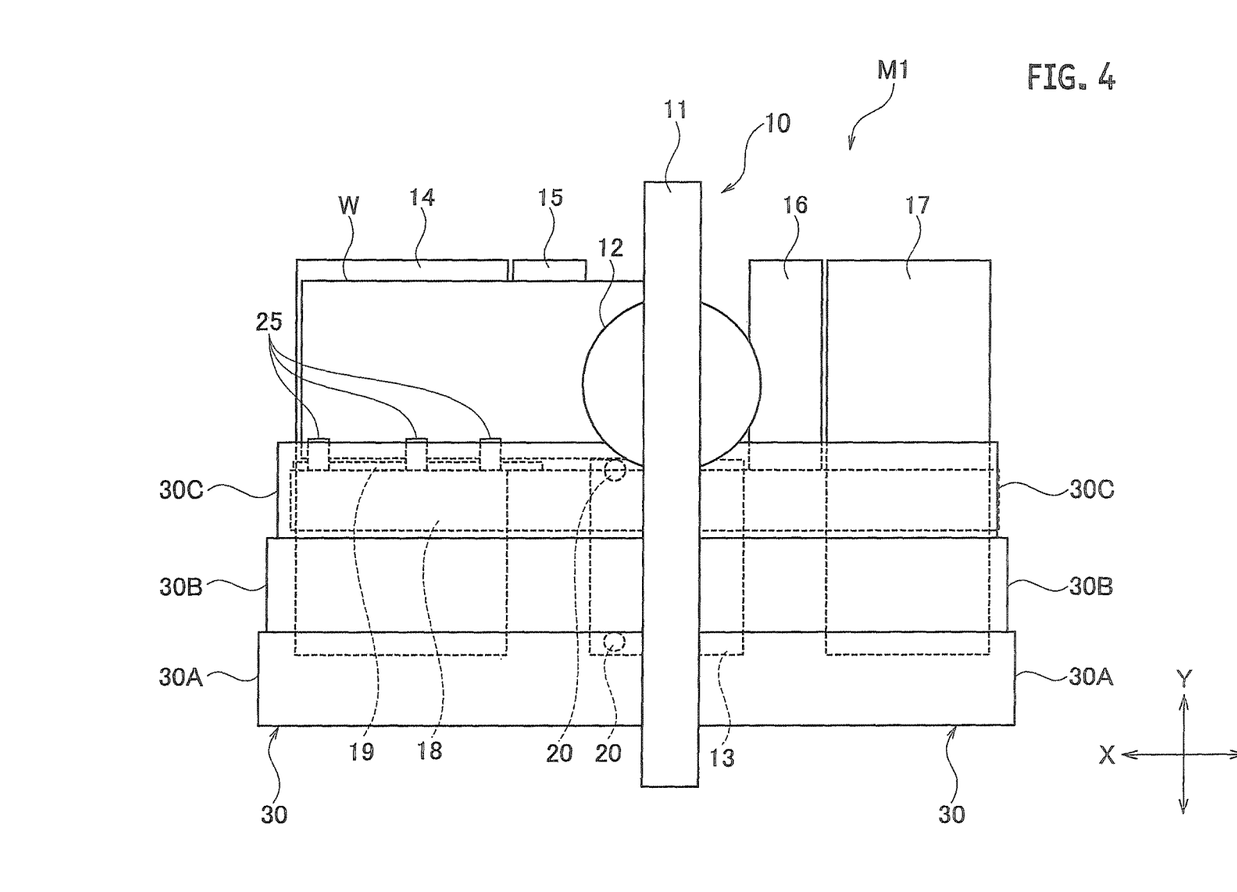
FIG. 4 It is a schematic plan view of the laser processing machine (a retracted state of the left and right covers: a workpiece carried-in state).

Or, in a case where a workpiece W is carried-in or carried-out while aligning it at a second original point as shown in FIG. 4, the workpiece W can be carried-in or carried-out by means of the clamping devices 25 by setting the movable cover 30 in the retracted (fully-opened) state and moving the Y-axis carriage 18 forward.

In addition, laser processing is carried out in a X-Y plane by moving a workpiece W in the X-axis direction by the X-axis carriage 19 and moving the laser processing head 20 in the Y-axis direction along the Y-axis sub-carriage 21 in the laser processing. Since a workpiece W is moved only in the X-axis direction in laser processing, a movable area of the workpiece W can be covered by the movable cover 30 to shield a laser light. Note that the up-and-down shutter 51 is lifted up during laser processing as shown in FIG. 6(a), and thereby the above-mentioned gap 30P is shut.

In addition, punch pressing is carried out by moving a workpiece W in the X-axis direction by the X-axis carriage 19 and moving the workpiece W in the Y-axis direction by the Y-axis carriage 18 during the punch pressing. Since a workpiece W is moved in the X-axis direction and in the Y-axis direction in punch pressing, the up-and-down shutter 51 is moved down as shown in FIG. 6(b), and thereby the above-mentioned gap 30P is opened to make the workpiece W capable of passing through the gap 30P.

As shown in FIG. 8, while moving a workpiece W, it is possible to stop the laser processing machine M1 by previously detecting a contact of the workpiece W and the lower edge 30a of the divided cover 30C or the like. Therefore, it becomes possible to surely prevent the movable cover 30, the Y-axis carriage 18 and so on from being damaged.

In the laser processing machine M1 according to the present embodiment, it is possible to adjust an area covering the upper surface of the processing table by the light-shielding movable cover 30 covering the upper surface of the processing table (the fixed tables 14 and 17). Namely, it is possible to cover only an area for laser processing by the movable cover 30 by adjusting a size of the movable cover 30. Therefore, it is possible to configure the movable cover 30 compactly (compared with a full cover covering an entire surface of the processing table, or a cover having a fixed size) while maintaining light-shielding performance of a laser light during laser processing, noise-shielding performance for noises generated during processing, and dust-resistant performance for spatters, grits, dusts and so on generated during processing. As the result, light-weighting and cost-reduction of the movable cover 30 can be achieved.

In addition, since the movable cover 30 can be opened to expose a necessary area for carrying in/out a workpiece W when carrying in/out the workpiece W as shown in FIG. 3 and FIG. 4, it is possible to carry in/out the workpiece W easily.

Further, since the movable cover 30 can change its position in addition to its size, it is possible to protect only a necessary area for laser processing efficiently.

Further, since the movable cover 30 is configured as a telescopic type cover, it can be configured to have a simple structure and can be operated easily. Then, the movable cover 30 can be transformed between the deployed state and the retracted state, and thereby can adjust an area covering the upper surface of the processing table easily.

Further, since the movable cover 30 is provided with the window 34 with a light-shielding filter, a state inside it can be visible during laser processing.

Furthermore, it is possible to prevent a laser light from leaking through the gap 30P between the lower edge 30a of the movable cover 30 and the processing table by lifting up the up-and-down shutter 51. On the other hand, it is possible to move a workpiece W while covering the processing table by the movable cover 30 by moving down the up-and-down shutter 51. Note that, since the up-and-down shutter 51 never contacts with a workpiece W, it is less wasted and superior in durability. A gap is closed by a flexible cover in prior art (see the Patent Document 1), but the flexible cover is inferior in durability due to contacts with a workpiece.

In the laser processing machine (the punch-pressing and laser-processing combined machine) M1 according to the present embodiment, since the carriages 18 and 19 that hold a workpiece W can be moved freely during laser processing, the movable cover 30 that is provided mainly for laser processing never be impeditive during punch pressing. Note that it is possible to shield noises generated during laser processing by the movable cover 30.

Furthermore, since it is possible to stop the punch-laser combined machine M1 before contacting a workpiece W and the lower edge 30a of the movable cover 30 with each other by detecting curling-up, jamming or the like of the workpiece W by the sensor 56, it becomes possible to surely prevent the movable cover 30, the Y-axis carriage 18 and so on from being damaged.

Figure 9:
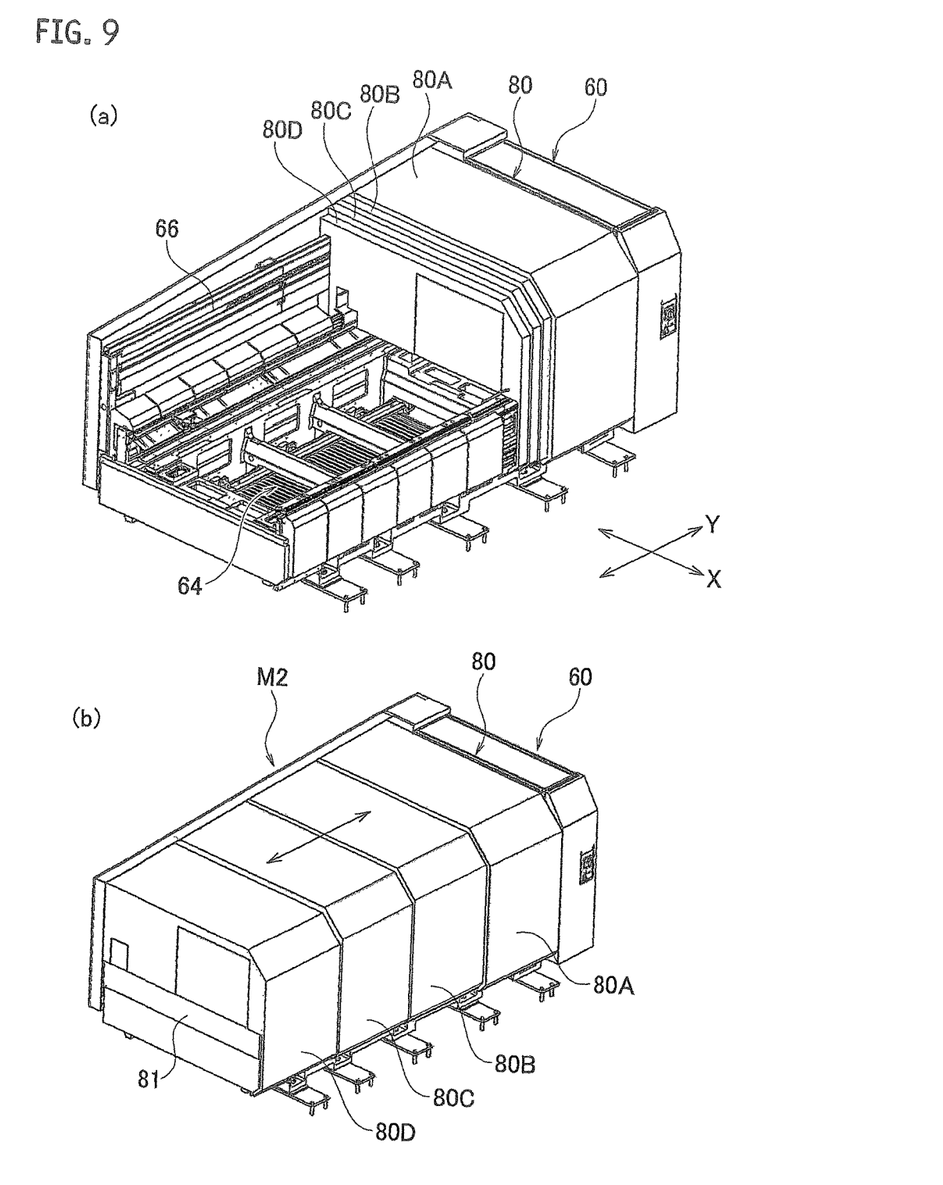

Next, a laser processing machine M2 according to a second embodiment will be described. As shown in FIG. 9(a) and FIG. 9(b), the laser processing machine M2 is a single-function processing machine that carries out only laser processing. The laser processing machine M2 includes a machine main body 60, a processing table 64 on which a workpiece is laid, and a light-shielding cover (a movable cover 80) that covers the processing table 64.

The machine main body 60 is provided with a carriage (not shown in the drawings) movable in a Y-axis direction, and a laser processing head (not shown in the drawings) movable in an X-axis direction orthogonal to the Y-axis direction in a horizontal plane. The processing table 64 is disposed along the Y-axis direction. A laser light is emitted to a workpiece laid on the processing table 64, and thereby the workpiece is laser-processed.

The movable cover 80 disposed above the processing table 64 is configured to be changed between a retracted state shown in FIG. 9(a) and a deployed state shown in FIG. 9(b). Therefore, the movable cover 80 can adjust an area covering the processing table 64. In addition, the movable cover 80 is movable in the Y-axis direction, and thereby can also change its position for covering the processing table 64.

The movable cover 80 is configured of divided covers 80A, 80B, 80C and 80D that have different sizes from each other and assembled slidably to each other in sequence in the Y-axis direction. Namely, the movable cover 80 is a telescopic type cover that is transformable between the deployed state in which the divided covers 80A, 80B, 80C and 80D are not stacked over each other and the retracted state in which the divided covers 80A, 80B, 80C and 80D are stacked over each other.

Note that the divided covers 80A, 80B, 80C and 80D are disposed slidably in the Y-axis direction along a slide rail 66. The deployment and retraction of the divided covers 80A, 80B, 80C and 80D may be done manually, or done automatically by an air cylinder or an electric cylinder. In addition, a gap between a lower edge of the divided cover 80D and the processing table 64 is opened or closed by an up-and-down shutter 81.

Also in the laser processing machine M2 according to the present embodiment, it is possible to adjust an area covering an upper surface of the processing table 64 by the light-shielding movable cover 80 covering the upper surface of the processing table 64. Namely, it is possible to cover only an area for laser processing by the movable cover 80 by adjusting a size of the movable cover 80. Therefore, it is possible to configure the movable cover 80 compactly (compared with a full cover covering an entire surface of a processing table, or a cover having a fixed size) while maintaining light-shielding performance of a laser light during laser processing, noise-shielding performance for noises generated during processing, and dust-resistant performance for spatters, grits, dusts and so on generated during processing. As the result, light-weighting and cost-reduction of the movable cover 80 can be achieved.

In addition, since the movable cover 80 can be opened to expose a necessary area for carrying in/out a workpiece W when carrying in/out the workpiece W, it is possible to carry in/out the workpiece W easily.

Further, since the movable cover 80 can change its position in addition to its size, it is possible to protect only a necessary area for laser processing efficiently.

Further, since the movable cover 80 is configured as a telescopic type cover, it can be configured to have a simple structure and can be operated easily. Then, the movable cover 80 can be transformed between the deployed state and the retracted state, and thereby can adjust an area covering the upper surface of the processing table 64 easily.

Hereinafter, other embodiments shown in FIG. 10 to FIG. 13 will be described.

Figure 10:
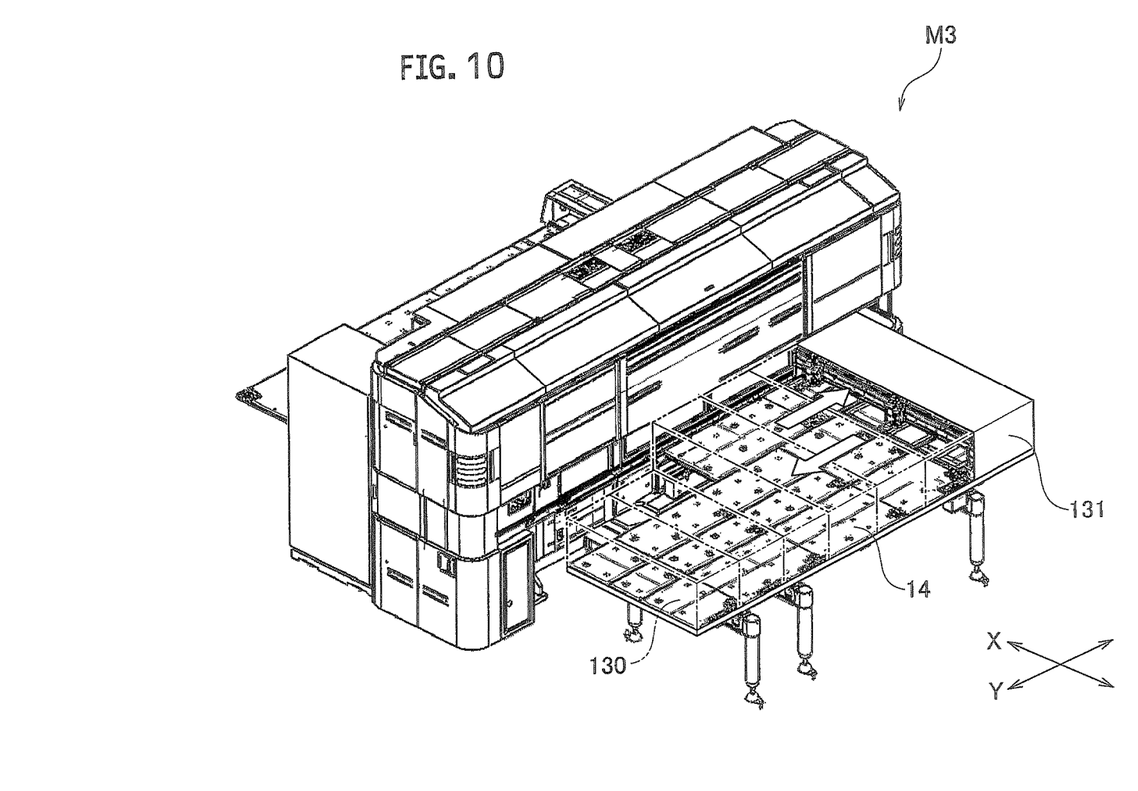
FIG. 10 It is a perspective view of a laser processing machine according to a third embodiment.

In a laser processing machine M3 according to a third embodiment shown in FIG. 10, a cover (a movable cover 130) slidable in a Y-axis direction is provided. The movable cover 130 in its deployed state covers an entire area of an upper surface of a processing table. A reference number "131" indicates a position of the retracted state.

Figure 11:
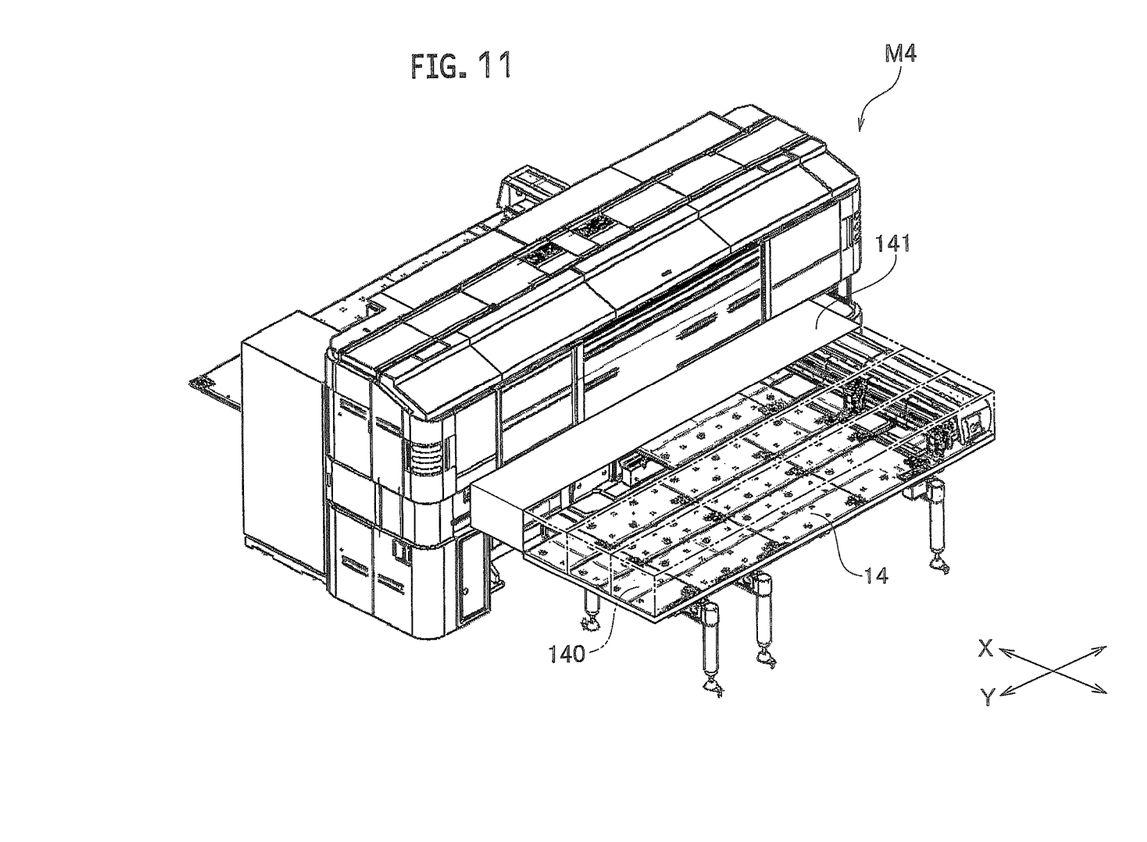
FIG. 11 It is a perspective view of a laser processing machine according to a fourth embodiment.

In a laser processing machine M4 according to a fourth embodiment shown in FIG. 11, a cover (a movable cover 140) slidable in an X-axis direction is provided. The movable cover 140 in its deployed state covers an entire area of an upper surface of a processing table. A reference number "141" indicates a position of the retracted state.

Figure 12:
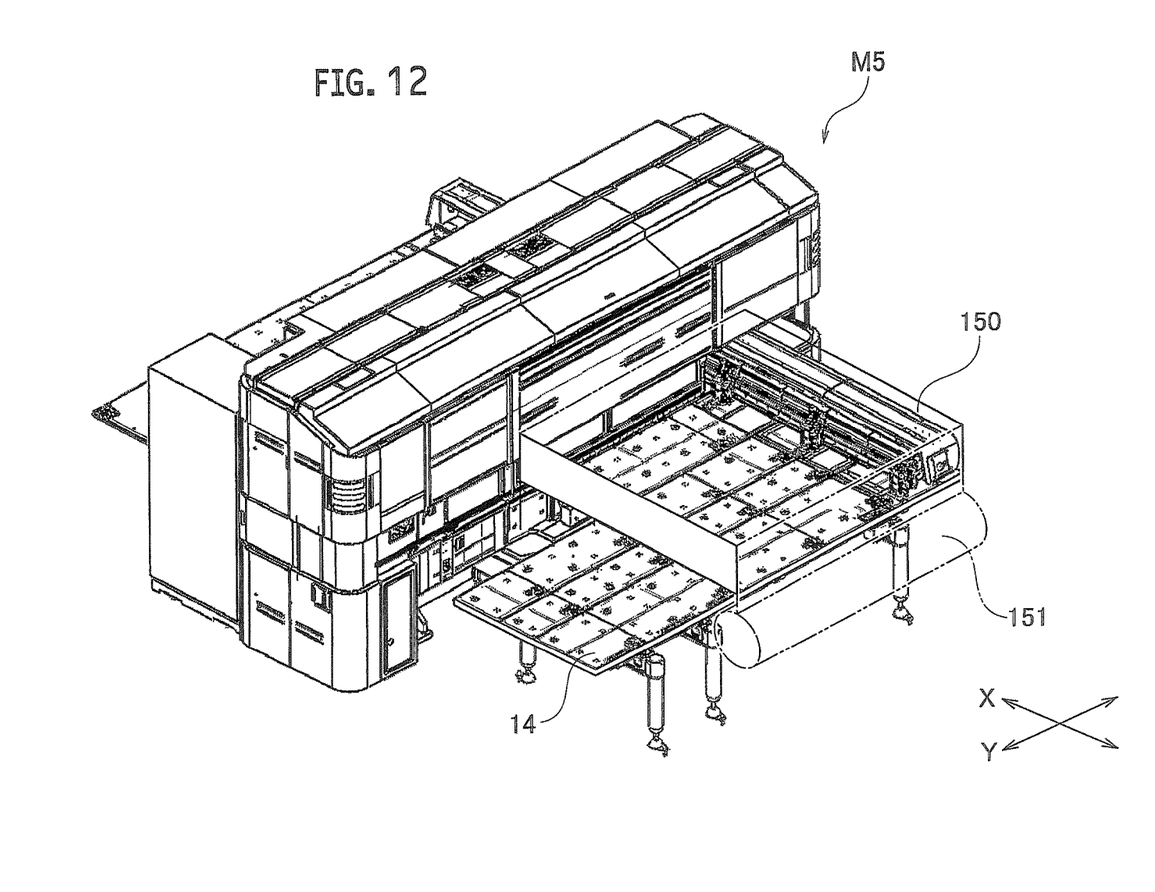
FIG. 12 It is a perspective view of a laser processing machine according to a fifth embodiment.

In a laser processing machine M5 according to a fifth embodiment shown in FIG. 12, a cover (a movable cover 150) that is expandable in an X-axis direction and storable is provided. The movable cover 150 in its stored state is stored below a processing table 14. A reference number "151" indicates a position of the stored state.

Figure 13:
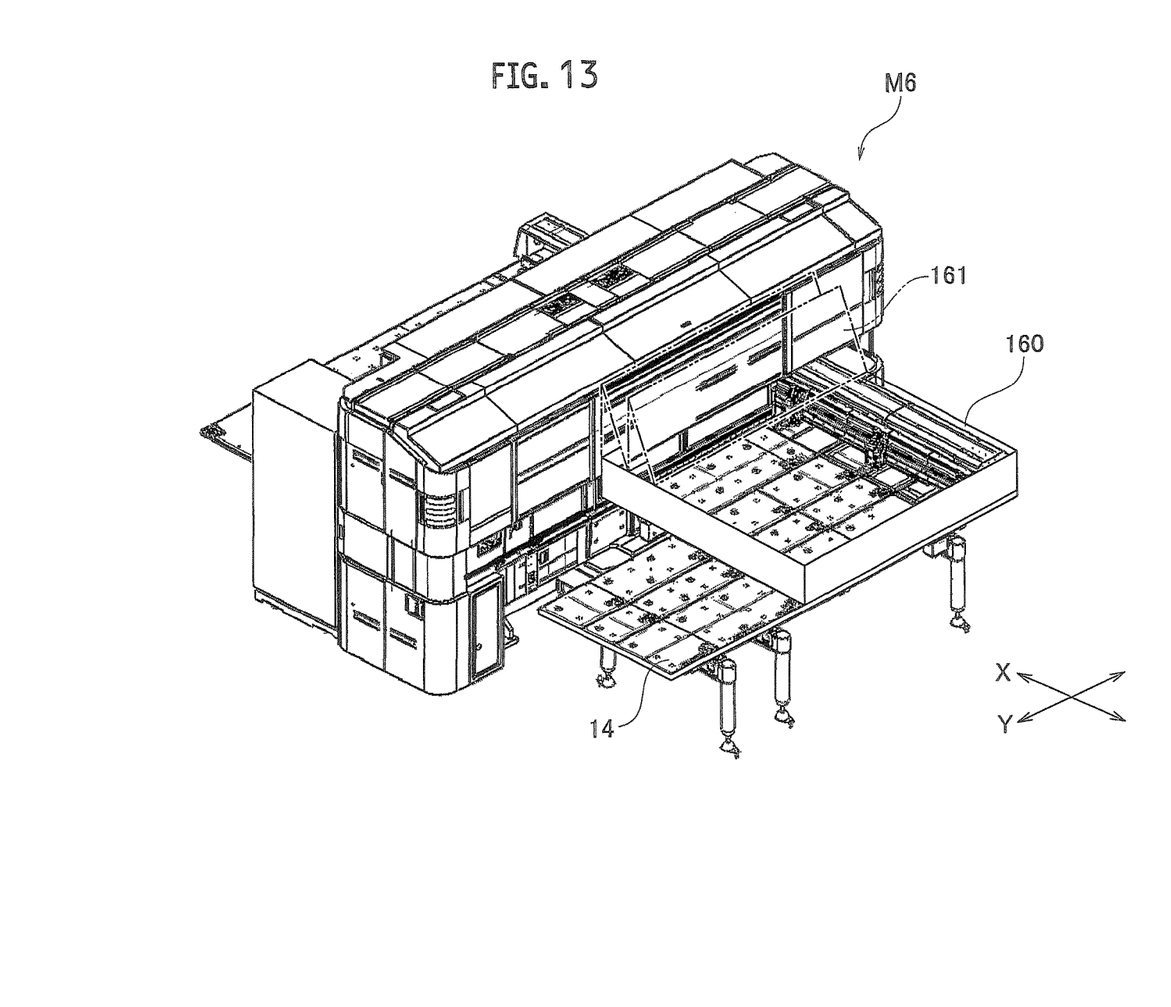
FIG. 13 It is a perspective view of a laser processing machine according to a sixth embodiment.

In a laser processing machine M6 according to a sixth embodiment shown in FIG. 13, a cover (a movable cover 160) that is expandable in an X-axis direction and storable is provided. A reference number "161" indicates a position of the stored state.

The invention claimed is:

1. A laser processing machine comprising:
a machine main body that has a laser processing head;
a processing table having a laser processing area on which a workpiece to be processed is laid; and
a light-shielding cover provided above the processing table and configured to cover an upper surface of the processing table;
the light-shielding cover being:
a transformable light-shielding cover between a deployed state and a retracted state; and
an adjustable light-shielding cover by being configured to adjust an area covering the upper surface of the processing table;
the laser processing head and the workpiece being configured for movement in relation to each other in the laser processing area; and
the light-shielding cover in the deployed state being configured to cover the laser processing area while the workpiece is being laser processed by the laser processing head.

2. The laser processing machine according to claim 1, wherein:
the light-shielding cover is configured to change a position thereof for covering the processing table.

3. The laser processing machine according to claim 1, wherein:
the light-shielding cover is configured of a plurality of divided covers that have different sizes and assembled slidably in sequence to be a telescopic light-shielding cover transformable between the deployed state and the retracted state.

4. The laser processing machine according to claim 1, wherein:
the light-shielding cover is provided with a window with a light-shielding filter.

5. The laser processing machine according to claim 1, wherein:
a gap that allows the workpiece to pass therethrough is formed between a lower edge of the light-shielding cover and the processing table; and
an up-and-down shutter that shuts the gap when being protruded upward is provided so as to be capable of protruding from an upper surface of the processing table.

6. The laser processing machine according to claim 1, further comprising:
a sensor provided above the processing table to detect a contact with the workpiece moving on the processing table.

7. The laser processing machine according to claim 1, further comprising:
a carriage that is movable within the light-shielding cover, and holds the workpiece; and
a turret that carries out turret punch pressing on the workpiece while moving the carriage.

8. The laser processing machine according to claim 1, wherein:
the light-shielding cover in the deployed state is configured to cover the laser processing head while the workpiece is being laser processed by the laser processing head.

* * * * *